(12) United States Patent
Tsai et al.

(10) Patent No.: US 12,474,760 B2
(45) Date of Patent: Nov. 18, 2025

(54) FACE TRACKING DEVICE, SYSTEM, AND METHOD

(71) Applicant: HTC Corporation, Taoyuan (TW)

(72) Inventors: Meng-Chi Tsai, Taoyuan (TW); Chun-Li Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 160 days.

(21) Appl. No.: 18/599,230

(22) Filed: Mar. 8, 2024

(65) Prior Publication Data

US 2025/0284332 A1    Sep. 11, 2025

(51) Int. Cl.
*G06F 1/3234* (2019.01)
*G02B 27/01* (2006.01)
*G06V 10/82* (2022.01)
*G06V 40/16* (2022.01)

(52) U.S. Cl.
CPC ......... *G06F 1/325* (2013.01); *G02B 27/0172* (2013.01); *G06V 10/82* (2022.01); *G06V 40/176* (2022.01)

(58) Field of Classification Search
CPC .... G02B 27/0172; G06F 1/325; G06V 10/82; G06V 40/176
See application file for complete search history.

(56) References Cited

U.S. PATENT DOCUMENTS

| 9,986,211 | B2 | 5/2018 | Gousev et al. | |
| 2019/0042833 | A1* | 2/2019 | Gernoth | G06V 40/172 |
| 2021/0019528 | A1* | 1/2021 | Ghadyali | G06F 11/3409 |
| 2021/0264025 | A1* | 8/2021 | Givental | G06N 3/0464 |
| 2022/0156554 | A1* | 5/2022 | Fu | G06N 3/0495 |
| 2023/0011430 | A1* | 1/2023 | Zhao | G06V 10/48 |

FOREIGN PATENT DOCUMENTS

| TW | 202300987 A | 1/2023 |
| TW | 202303527 A | 1/2023 |

OTHER PUBLICATIONS

The office action of the corresponding Taiwanese application No. TW113134010 issued on Jan. 24, 2025.

* cited by examiner

*Primary Examiner* — Terrell S Johnson
(74) *Attorney, Agent, or Firm* — CKC & Partners Co., LLC

(57) ABSTRACT

A face tracking device, system, and method are provided. The device determines a behavioral state corresponding to a face area of a user based on multiple real-time images. The device adjusts the inference rate of a neural network based on the behavioral state. The device generates face tracking information corresponding to the user based on the real-time images and the neural network, and the neural network is controlled to execute based on the inference rate.

20 Claims, 7 Drawing Sheets

FACE TRACKING DEVICE, SYSTEM, AND METHOD

BACKGROUND

Field of Invention

The present invention relates to a face tracking device, system, and method. More particularly, the present invention relates to a face tracking device, system, and method that can dynamically adjust the consumption of computing resources for face tracking.

Description of Related Art

In recent years, various technologies related to virtual reality have developed rapidly, and various technologies and application have been proposed one after another.

When a user uses the device to perform related interactive operations (such as a head-mounted display), the device can analyze real-time images through computer vision to perform the face tracking operation of the user.

However, in the prior art, performing computer vision analysis (such as neural network) on a large number of real-time images requires consuming a large amount of computing resources and power resources, thus increasing the resource cost required by the device.

Accordingly, there is an urgent need for a face tracking technology that can dynamically adjust the consumption of computing resources for face tracking.

SUMMARY

An objective of the present disclosure is to provide a face tracking device. The face tracking device comprises an image capturing device and a processor, and the processor is electrically connected to the image capturing device. The image capturing device is configured to generate a plurality of real-time images including a face area corresponding to a user. The processor determines a behavioral state corresponding to the face area of the user based on the real-time images. The processor adjusts an inference rate of a neural network based on the behavioral state. The processor generates a face tracking information corresponding to the user based on the real-time images and the neural network, wherein the neural network is controlled to execute based on the inference rate.

Another objective of the present disclosure is to provide a face tracking system. The face tracking system comprises an image capturing device and a head-mounted display, and the head-mounted display is electrically connected to the image capturing device. The head-mounted display receives a plurality of real-time images including a face area corresponding to a user from the image capturing device. The head-mounted display determines a behavioral state corresponding to the face area of the user based on the real-time images. The head-mounted display adjusts an inference rate of a neural network based on the behavioral state. The head-mounted display generates a face tracking information corresponding to the user based on the real-time images and the neural network, wherein the neural network is controlled to execute based on the inference rate.

Another objective of the present disclosure is to provide a face tracking method, which is adapted for use in an electronic apparatus. The face tracking method comprises the following steps: determining, based on a plurality of real-time images including a face area corresponding to a user, a behavioral state corresponding to the face area of the user; adjusting an inference rate of a neural network based on the behavioral state; and generating a face tracking information corresponding to the user based on the real-time images and the neural network, wherein the neural network is controlled to execute based on the inference rate.

According to the above descriptions, the face tracking technology (at least including the device, system, and method) provided by the present disclosure adjusts the inference rate of the neural network by determining the behavioral state of the face area of the user. Next, the face tracking technology provided by the present disclosure generates face tracking information based on the inference rate of the neural network. The face tracking technology provided by the present disclosure can dynamically adjust the computing resource consumption of face tracking based on the behavioral state of the user, thereby reducing the resource cost of the device and improving the execution efficiency of the device.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a face tracking device, system, and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
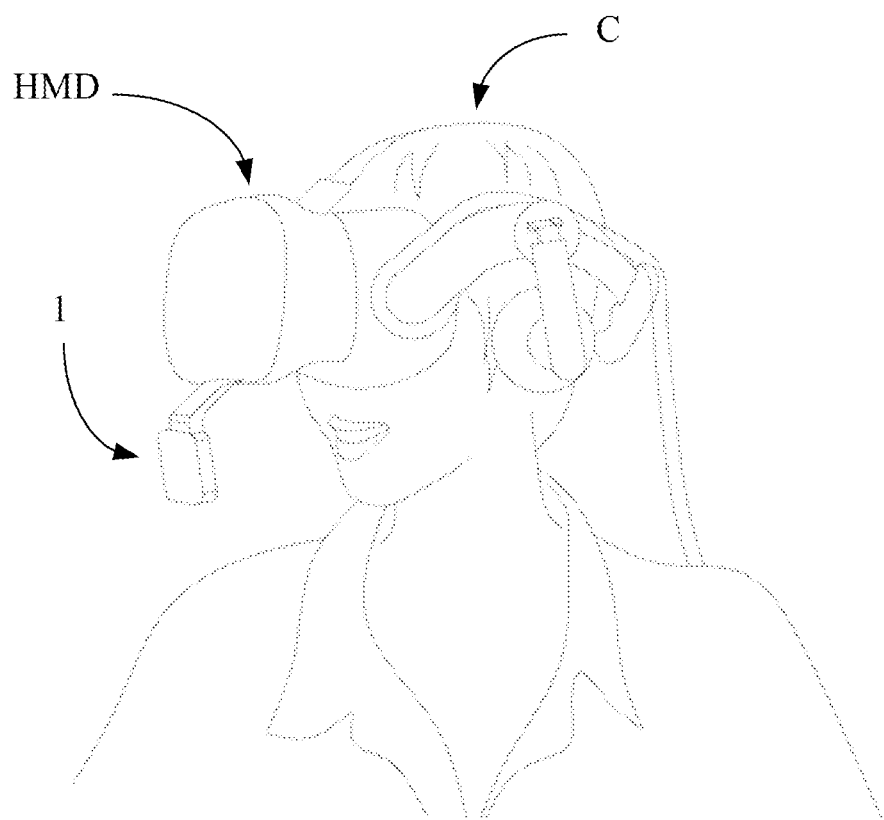
FIG. 1 is a schematic view depicting an application environment of some embodiments.

The applicable scenario of the present embodiment will be described first, and its schematic diagram is depicted in FIG. 1. As shown in FIG. 1, in the schematic diagram of the application environment of the present disclosure, the user C uses the head-mounted display HMD, and the head-mounted display HMD is connected to the face tracking device 1 through wired or wireless means (for example: Bluetooth communication connection) to perform a face tracking operation corresponding to the user C.

Figure 3:
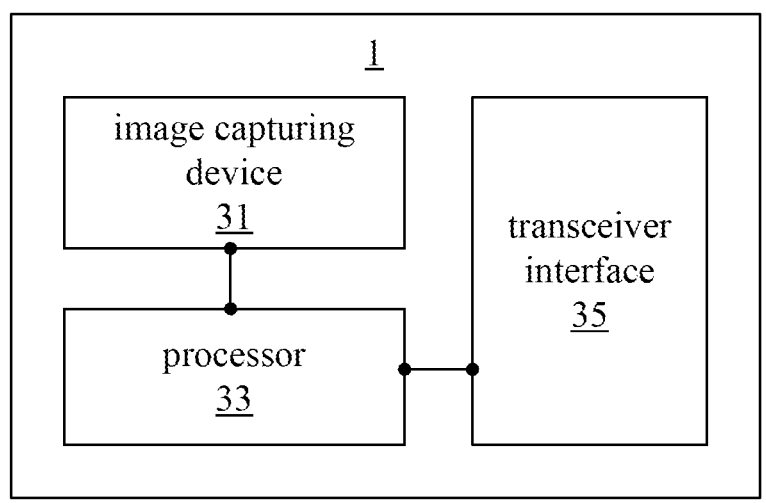
FIG. 3 is a schematic view depicting a face tracking device of the first embodiment.

A first embodiment of the present disclosure is a face tracking device 1 and a schematic view of which is depicted in FIG. 3. In the present embodiment, the face tracking device 1 comprises an image capturing device 31, a processor 33, and a transceiver interface 35, and the processor 13 is electrically connected to the image capturing device 31 and the transceiver interface 35.

It shall be appreciated that the image capturing device 31 can be any device with an image cap capturing function. For example, the image capturing device 31 may comprise a plurality of image capturing units (e.g., a plurality of depth camera lenses) for generating a real-time image corresponding to a field of view (FOV), and the real-time images includes the face area corresponding to the user C (e.g., the lower part of the face including the mouth).

Furthermore, the processor 33 may be any of various processors, Central Processing Units (CPUs), microprocessors, digital signal processors or other computing apparatuses known to those of ordinary skill in the art. The transceiver interface 35 is an interface capable of receiving and transmitting data or other interfaces capable of receiving and transmitting data and known to those of ordinary skill in the art.

In some embodiments, the face tracking device 1 can be disposed in other devices or combined with a device with computing capabilities (for example, using the processor of the head-mounted display HMD). The face tracking device 1 can be disposed in the head-mounted display HMD. The processor 33 can be a processor built into the head-mounted display HMD. The transceiver interface 35 can be a transceiver interface built into the head-mounted display HMD.

First, in the present embodiment, the processor 33 determines a behavioral state corresponding to the face area of the user C based on the real-time images.

In some embodiments, the behavior state includes an active state and an inactive state. For example, when the user C's facial expression changes greatly, the face area of the user C corresponds to the active state. When the user C's facial expression changes less, the face area of the user C corresponds to the inactive state.

It shall be appreciated that in the present disclosure, when the processor 33 determines that the user C corresponds to the active state, it means that the user C's face has changed significantly, and therefore more computing resources are required to generate the face tracking information of the user. In addition, when the processor 33 determines that the user C corresponds to the inactive state, it means that the change in the user C's face is small or even static. Therefore, the computing resources spent on generating the face tracking information of the user can be reduced.

In some embodiments, the processor 33 can determine the behavioral status of the user C through different standards, such as time interval and number of images in the queue.

Taking a time interval as an example, the processor 33 can calculate a first image variation degree of the real-time images corresponding to a time interval (e.g., 500 milliseconds). In response to the first image variation degree being greater than a first variation threshold, the processor 33 determines that the face area corresponding to the user C is in the active state. In response to the first image variation degree being less than the first variation threshold, the processor 33 determines that the face area corresponding to the user C is in the inactive state.

Taking the queue quantity as an example, the processor 33 may calculate a second image variation degree of the real-time images corresponding to a queue quantity. In response to the second image variation degree being greater than a second variation threshold, the processor 33 determines that the face area corresponding to the user C is in the active state. In response to the second image variation degree being less than the second variation threshold, the processor 33 determines that the face area corresponding to the user C is in the inactive state.

Figure 5:
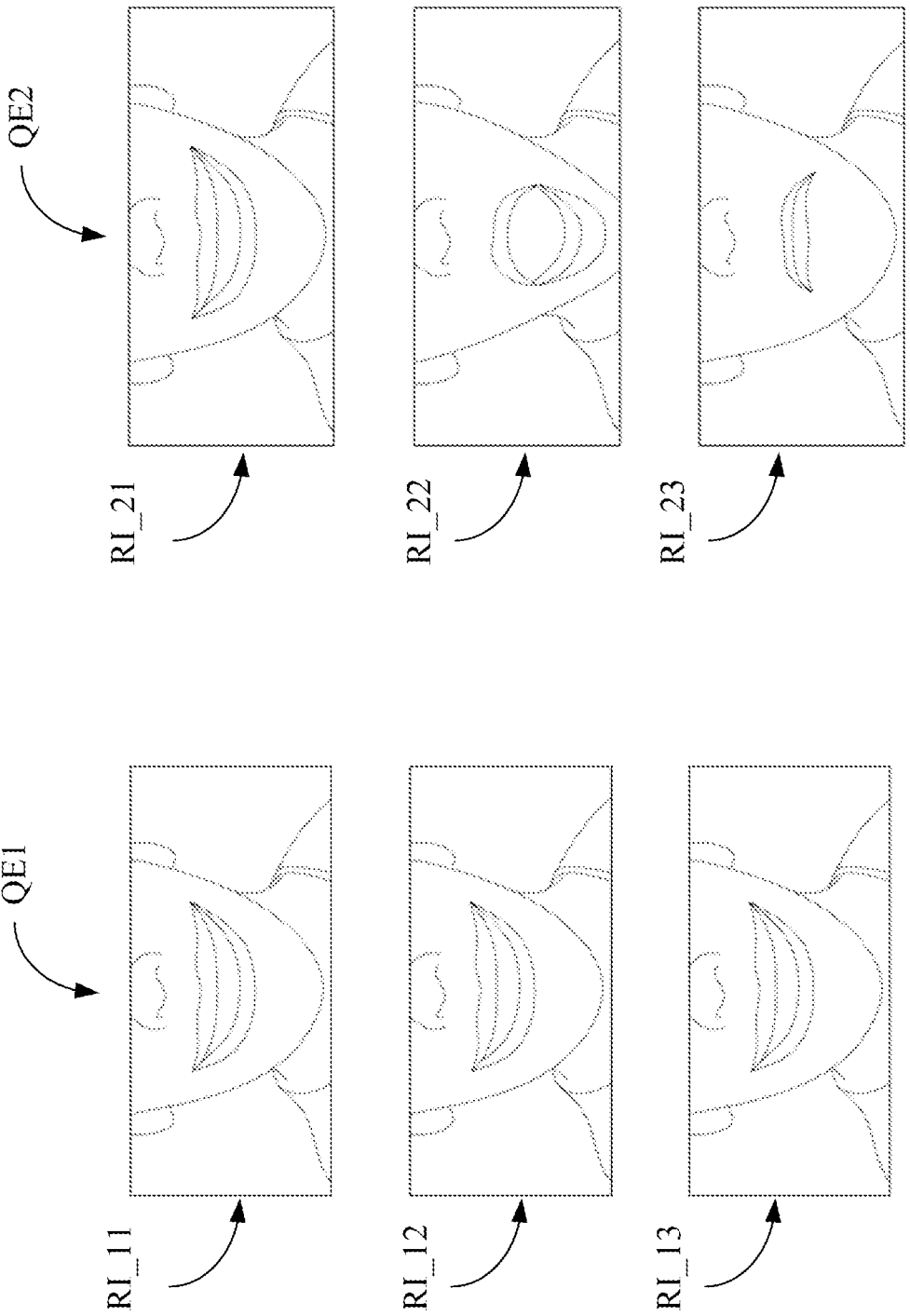
FIG. 5 is a schematic view depicting the real-time images of some embodiments.

For ease of understanding, please refer to FIG. 5. FIG. 5 illustrates the first queue QE1 and the second queue QE2 that can store three real-time images. In the present example, the first queue QE1 and the second queue QE2 respectively store real-time images generated at consecutive time points (e.g., the real-time images contain the lower part of the face, including the mouth).

In the present example, the processor 33 determines that the image variation degree of the real-time images RI_11, RI_12, and RI_13 in the first queue QE1 is less than the variation threshold (i.e., the difference between the real-time images is small), and therefore determines that the face area corresponding to the user C is in the inactive state. In addition, in the present example, the processor 33 determines that the image variation degree of the real-time images RI_21, RI_22, and RI_23 in the second queue QE2 is greater than the variation threshold (i.e., the difference between the real-time images is large), and therefore determines that the face area corresponding to the user C is in the active state.

In addition, in some embodiments, the processor 33 can also determine whether the user C is speaking through the environmental sound signal, so as to determine the behavioral state of the face area corresponding to the user C (i.e., when the user C is speaking, the face area of the user C corresponds to the active state; when the user C is not speaking, the face area of the user C corresponds to the inactive state).

Specifically, the processor 33 receives an environmental sound signal corresponding to a physical space where the user C is located, wherein the environmental sound signal is generated by a microphone. Next, the processor 33 analyzes whether the environmental sound signal is a human voice or a non-human voice to determine whether the face area corresponding to the user C is in the active state or the inactive state.

In some embodiments, the environmental sound signal is generated by the microphone disposed around the face area of the user C. For example, the microphone can be disposed on the face tracking device 1 or the head-mounted display HMD.

Next, the processor 33 adjusts an inference rate of a neural network based on the behavioral state.

It shall be appreciated that the inference rate of the neural network represents the proportion of the number of analysis operations performed by the neural network. When the inference rate is higher, it means that the proportion of real-time images that the neural network needs to calculate is higher. When the inference rate is lower, it means that the proportion of real-time images that the neural network needs to calculate is lower. For example, when the inference rate is 100%, the neural network analyzes every real-time image input into the neural network model. When the inference rate is 50%, the neural network may only analyze one of every two real-time images input into the neural network model.

In some embodiments, the processor 33 can adjust the inference rate of the neural network based on the behavioral state. Specifically, in response to the face area of the user C being in the active state, the processor 33 increases the inference rate of the neural network. In response to the face area of the user C being in the inactive state, the processor 33 decreases the inference rate of the neural network.

In some embodiments, in order to make the processing results of the neural network more accurate, the processor 33 can also gradually adjust the inference rate based on determining the behavioral state of the user C. Specifically, the processor 33 may set a highest preset inference rate and a lowest preset inference rate corresponding to the neural network. In response to the face area of the user C being in the active state, the processor 33 gradually increases the inference rate of the neural network to the highest preset inference rate based on a first adjustment value. In response to the face area of the user C being in the inactive state, the processor 33 gradually decreases the inference rate of the neural network to the lowest preset inference rate based on a second adjustment value.

For example, the processor 33 can set the highest preset inference rate corresponding to the neural network to 80% and the lowest preset inference rate corresponding to the neural network to 20%. In response to the face area of the user C being in the active state, the processor 33 increases the inference rate by the adjustment value of 10% each time, gradually increasing the inference rate to the highest preset inference rate of 80%. In response to the face area of the user C being in the inactive state, the processor 33 decreases the inference rate by the adjustment value of 20% each time, gradually decreasing the inference rate to the lowest preset inference rate of 20%.

In some embodiments, the processor 33 can also adjust the capturing frame rate of the image capturing device 31 generating the real-time images based on determining the behavioral state of the user C, so as to adjust the quantity of the real-time images input to the neural network. Specifically, the processor 33 determines whether the face area corresponding to the user C is in the active state or the inactive state, and adjusts a capturing frame rate of the image capturing device 31 configured to generate the real-time images.

In some embodiments, the processor 33 can also directly adjust the input quantity of the real-time images input to the neural network by adjusting the capturing frame rate corresponding to the image capturing device 31, so as to reduce the resource consumption of the image capturing device 31 and the neural network. Specifically, in response to the face area of the user C being in the active state, the processor 33 increases the capturing frame rate corresponding to the image capturing device 31 to increase a input quantity of the real-time images input to the neural network. In response to the face area of the user C being in the inactive state, the processor 33 decreases the capturing frame rate corresponding to the image capturing device 31 to decrease the input quantity of the real-time images input to the neural network.

In some embodiments, the processor 33 can also gradually adjust the capturing frame rate based on determining the behavioral state of the user C. For example, the processor 33 may set the maximum capturing frame rate corresponding to the image capturing device 31 to 64 fps and the minimum capturing frame rate to 8 fps. In response to the face area of the user C being in the active state, the processor 33 increases the capturing frame rate by the adjustment value of 8 fps each time, gradually increasing the capturing frame rate to the maximum capture frame rate of 64 fps. In response to the face area of the user C being in the inactive state, the processor 33 decreases the capturing frame rate by the adjustment value of 8 fps each time, gradually decreasing the capturing frame rate to the minimum capturing frame rate of 8 fps.

Finally, the processor 33 generates a face tracking information corresponding to the user C based on the real-time images and the neural network, and the neural network is controlled to execute based on the inference rate.

In some embodiments, the face tracking information includes a face blend shape information, and the processor 33 can generate the face blend shape information corresponding to user C by analyzing the real-time images, and generate corresponding face expressions based on the face blend shape information.

It shall be appreciated that the face blend shape information is used to represent the user C's plural face muscle tension values in the face area (e.g., 36 muscle values of the face). For example, the face blend shape information can be expressed in the form of a matrix, and each value is usually between 0 and 1. When the value is larger, it means that the muscle tension in that part is higher.

Specifically, the processor 33 inputs the real-time images into the neural network to generate the face blend shape information corresponding to the user C. Next, the processor 33 generates a face expression corresponding to a virtual character (e.g., avatar) of the user C based on the face blend shape information.

In some embodiments, the face tracking device 1 can transmit the face tracking information corresponding to the user C or the face expression of the virtual character to the head-mounted display HMD for display and interactive operation.

Figure 6:
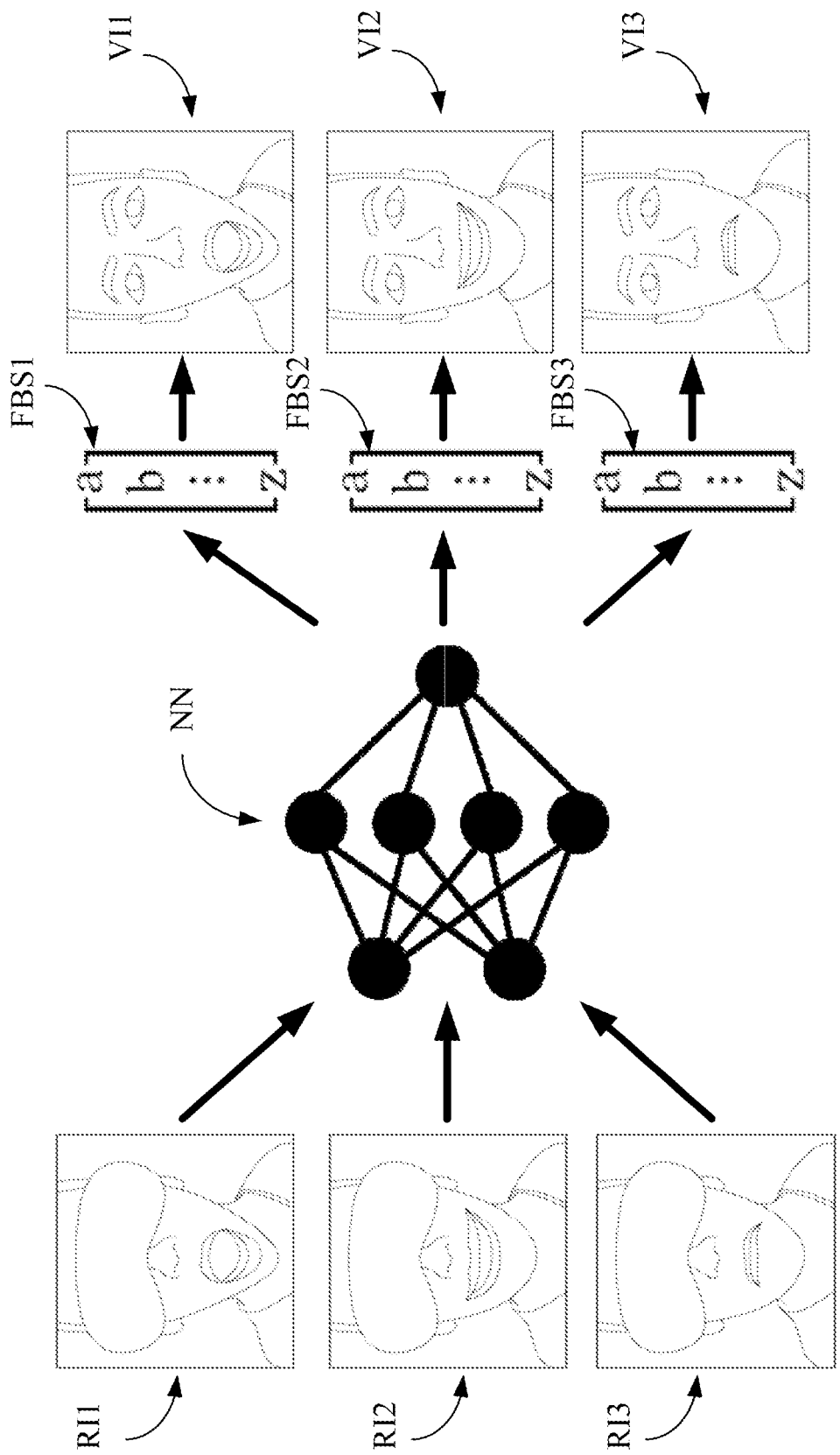
FIG. 6 is a schematic view depicting the operation of generating virtual character images of some embodiments.

For ease of understanding, please refer to FIG. 6. As shown in FIG. 6, the processor 33 can generate corresponding face blend shape information FBS1, FBS2, and FBS3 by inputting the real-time images RI1, RI2, and RI3 to the neural network NN. Next, the processor 33 generates corresponding virtual character images VI1, VI2, and VI3 based on the face blend shape information FBS1, FBS2, and FBS3.

According to the above descriptions, the face tracking device 1 provided by the present disclosure adjusts the inference rate of the neural network by determining the behavioral state of the face area of the user C. Next, the face tracking device 1 provided by the present disclosure generates face tracking information based on the inference rate of the neural network. The face tracking device 1 provided by the present disclosure can dynamically adjust the computing resource consumption of face tracking based on the behavioral state of the user C, thereby reducing the resource cost of the device and improving the execution efficiency of the device.

Figure 2:
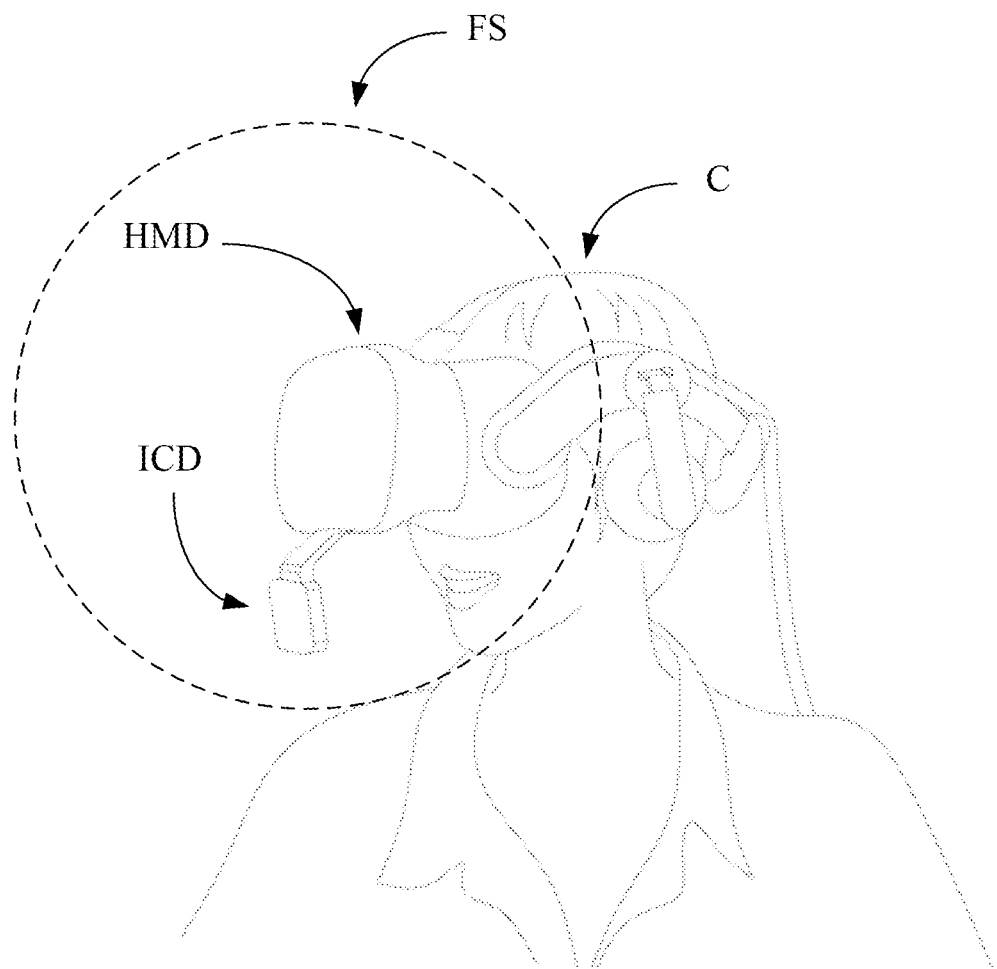
FIG. 2 is a schematic view depicting an application environment of some embodiments.

The second embodiment of the present disclosure is a face tracking system FS, and its architecture schematic diagram is depicted in FIG. 2. In the present embodiment, the user C uses the face tracking system FS. The face tracking system FS comprises an image capturing device ICD and a head-mounted display HMD. The head-mounted display HMD is communicatively connected to the image capturing device ICD.

Figure 4:
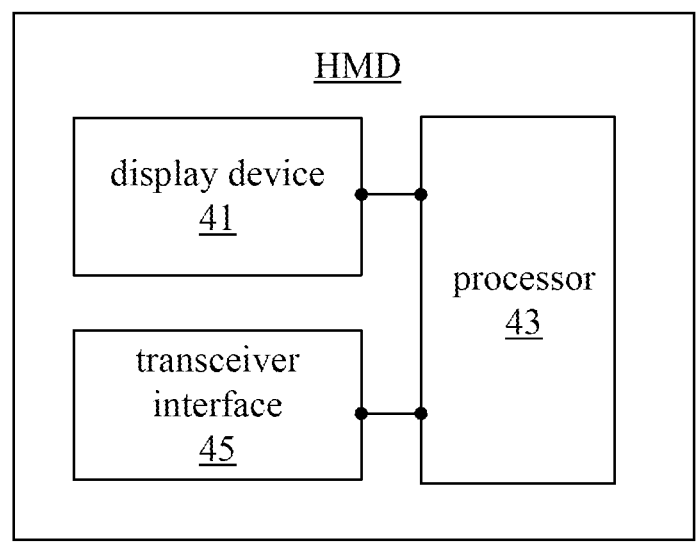
FIG. 4 is a schematic view depicting a head-mounted display of some embodiments.

In the present embodiment, as shown in FIG. 4, the head-mounted display HMD comprises a display device 41, a processor 43, and a transceiver interface 45. The processor 43 is electrically connected to the display device 41 and the transceiver interface 45. In addition, since the implementation of the transceiver interface 45 and the processor 43 is the same as that of the transceiver interface 35 and the processor 33 in the face tracking device 1, and the implementation of the image capturing device ICD is similar to the image capturing device 31 in the face tracking device 1, so the details will not be described again.

It shall be appreciated that in the first embodiment, the face tracking information corresponding to the user C is generated by the face tracking device 1 alone. In the second embodiment, the image capturing device ICD transmits the generated real-time images to the head-mounted display HMD for subsequent calculations. Since part of the operations of the face tracking system FS is similar to the face tracking device 1 in the first embodiment, for ease of understanding, only the different operations will be described below.

In some embodiments, the image capturing device ICD can be connected to the head-mounted display HMD through an external connection (e.g., through a universal serial bus connection).

In the present embodiment, the image capturing device ICD is configured to generate a plurality of real-time images including a face area corresponding to a user.

Next, the head-mounted display HMD receives the real-time images from the image capturing device ICD. The head-mounted display HMD determines a behavioral state corresponding to the face area of the user based on the real-time images.

Subsequently, the head-mounted display HMD adjusts an inference rate of a neural network based on the behavioral state. Finally, the head-mounted display HMD generates a face tracking information corresponding to the user based on the real-time images and the neural network, and the neural network is controlled to execute based on the inference rate.

Figure 7:
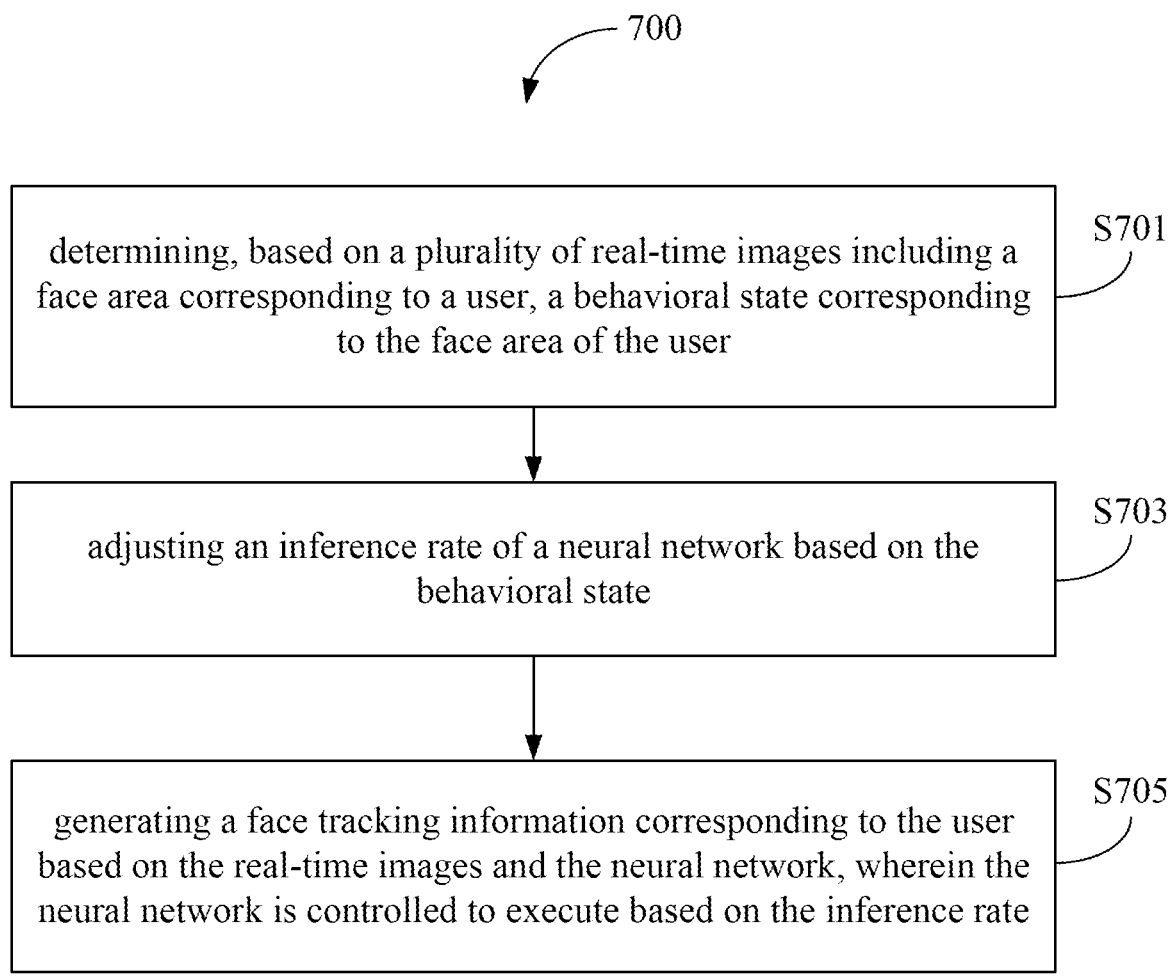
FIG. 7 is a partial flowchart depicting a face tracking method of the second embodiment.

A third embodiment of the present disclosure is a face tracking method and a flowchart thereof is depicted in FIG. 7. The face tracking method 700 is adapted for an electronic apparatus (e.g., the face tracking device 1 of the first embodiment or the face tracking system FS of the third embodiment). The face tracking method 700 generates face tracking information corresponding to the user through the steps S701 to S705.

In the step S701, the electronic apparatus determines, based on a plurality of real-time images including a face area corresponding to a user, a behavioral state corresponding to the face area of the user.

Next, in the step S703, the electronic apparatus adjusts an inference rate of a neural network based on the behavioral state.

Finally, in the step S705, the electronic apparatus generates a face tracking information corresponding to the user based on the real-time images and the neural network, wherein the neural network is controlled to execute based on the inference rate.

In some embodiments, the face tracking information includes a face blend shape information, and the face tracking method 700 further comprises the following steps: inputting the real-time images into the neural network to generate the face blend shape information corresponding to the user, wherein the face blend shape information corresponds to a plurality of face muscle tension values in the face area; and generating a face expression corresponding to a virtual character of the user based on the face blend shape information.

In some embodiments, the behavior state includes an active state and an inactive state, and the face tracking method 700 further comprises the following steps: calculating a first image variation degree of the real-time images corresponding to a time interval; in response to the first image variation degree being greater than a first variation threshold, determining that the face area corresponding to the user is in the active state; and in response to the first image variation degree being less than the first variation threshold, determining that the face area corresponding to the user is in the inactive state.

In some embodiments, the behavior state includes an active state and an inactive state, and the face tracking method 700 further comprises the following steps: calculating a second image variation degree of the real-time images corresponding to a queue quantity; in response to the second image variation degree being greater than a second variation threshold, determining that the face area corresponding to the user is in the active state; and in response to the second image variation degree being less than the second variation threshold, determining that the face area corresponding to the user is in the inactive state.

In some embodiments, the behavior state includes an active state and an inactive state, and the step of adjusting the inference rate of the neural network further comprises the following steps: in response to the face area of the user being in the active state, increasing the inference rate of the neural network; and in response to the face area of the user being in the inactive state, decreasing the inference rate of the neural network.

In some embodiments, the neural network corresponds to a highest preset inference rate and a lowest preset inference rate, and the face tracking method 700 further comprises the following steps: in response to the face area of the user being in the active state, gradually increasing the inference rate of the neural network to the highest preset inference rate based on a first adjustment value; and in response to the face area of the user being in the inactive state, gradually decreasing the inference rate of the neural network to the lowest preset inference rate based on a second adjustment value.

In some embodiments, the behavior state includes an active state and an inactive state, and the face tracking method 700 further comprises the following steps: adjusting a capturing frame rate of an image capturing device configured to generate the real-time images by determining whether the face area corresponding to the user is in the active state or the inactive state.

In some embodiments, the step of adjusting the capturing frame rate corresponding to the image capturing device further comprises the following steps: in response to the face area of the user being in the active state, increasing the capturing frame rate corresponding to the image capturing device to increase a input quantity of the real-time images input to the neural network; and in response to the face area of the user being in the inactive state, decreasing the capturing frame rate corresponding to the image capturing device to decrease the input quantity of the real-time images input to the neural network.

In some embodiments, the behavior state includes an active state and an inactive state, and the face tracking method further comprises the following steps: receiving an environmental sound signal corresponding to a physical space where the user is located, wherein the environmental sound signal is generated by a microphone; and analyzing whether the environmental sound signal is a human voice or a non-human voice to determine whether the face area corresponding to the user is in the active state or the inactive state.

In some embodiments, the environmental sound signal is generated by the microphone disposed around the face area of the user.

In addition to the aforesaid steps, the third embodiment can also execute all the operations and steps of the face tracking device 1 set forth in the first embodiment and the face tracking system FS set forth in the second embodiment, have the same functions, and deliver the same technical effects as the first embodiment. How the third embodiment executes these operations and steps, has the same functions, and delivers the same technical effects will be readily appreciated by those of ordinary skill in the art based on the explanation of the first embodiment and the second embodiment. Therefore, the details will not be repeated herein.

The face tracking method described in the third embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the face tracking device 1 or the face tracking system FS), the computer program executes the face tracking method as described in the third embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., image variation degree, variation threshold, and adjustment value, etc.) are preceded by terms such as "first" or "second", and these terms of "first" or "second" are only used to distinguish these different words. For example, the "first" image variation degree and "second" image variation degree are only used to indicate the image variation degree used in different operations.

According to the above descriptions, the face tracking technology (at least including the device, system, and method) provided by the present disclosure adjusts the inference rate of the neural network by determining the behavioral state of the face area of the user. Next, the face tracking technology provided by the present disclosure generates face tracking information based on the inference rate of the neural network. The face tracking technology provided by the present disclosure can dynamically adjust the computing resource consumption of face tracking based on the behavioral state of the user, thereby reducing the resource cost of the device and improving the execution efficiency of the device.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A face tracking method, being adapted for use in an electronic apparatus, wherein the face tracking method comprises:
   determining, based on a plurality of real-time images including a face area corresponding to a user, a behavioral state corresponding to the face area of the user;
   adjusting an inference rate of a neural network based on the behavioral state; and
   generating a face tracking information corresponding to the user based on the real-time images and the neural network, wherein the neural network is controlled to execute based on the inference rate.

2. The face tracking method of claim 1, wherein the face tracking information includes a face blend shape information, and the face tracking method further comprises the following steps:
   inputting the real-time images into the neural network to generate the face blend shape information corresponding to the user, wherein the face blend shape information corresponds to a plurality of face muscle tension values in the face area; and
   generating a face expression corresponding to a virtual character of the user based on the face blend shape information.

3. The face tracking method of claim 1, wherein the behavior state includes an active state and an inactive state, and the face tracking method further comprises the following steps:
   calculating a first image variation degree of the real-time images corresponding to a time interval;
   in response to the first image variation degree being greater than a first variation threshold, determining that the face area corresponding to the user is in the active state; and
   in response to the first image variation degree being less than the first variation threshold, determining that the face area corresponding to the user is in the inactive state.

4. The face tracking method of claim 1, wherein the behavior state includes an active state and an inactive state, and the face tracking method further comprises the following steps:
   calculating a second image variation degree of the real-time images corresponding to a queue quantity;
   in response to the second image variation degree being greater than a second variation threshold, determining that the face area corresponding to the user is in the active state; and
   in response to the second image variation degree being less than the second variation threshold, determining that the face area corresponding to the user is in the inactive state.

5. The face tracking method of claim 1, wherein the behavior state includes an active state and an inactive state, and the step of adjusting the inference rate of the neural network further comprises the following steps:
   in response to the face area of the user being in the active state, increasing the inference rate of the neural network; and
   in response to the face area of the user being in the inactive state, decreasing the inference rate of the neural network.

6. The face tracking method of claim 5, wherein the neural network corresponds to a highest preset inference rate and a lowest preset inference rate, and the face tracking method further comprises the following steps:

in response to the face area of the user being in the active state, gradually increasing the inference rate of the neural network to the highest preset inference rate based on a first adjustment value; and in response to the face area of the user being in the inactive state, gradually decreasing the inference rate of the neural network to the lowest preset inference rate based on a second adjustment value.

7. The face tracking method of claim 1, wherein the behavior state includes an active state and an inactive state, and the face tracking method further comprises the following steps:

adjusting a capturing frame rate of an image capturing device configured to generate the real-time images by determining whether the face area corresponding to the user is in the active state or the inactive state.

8. The face tracking method of claim 7, wherein the step of adjusting the capturing frame rate corresponding to the image capturing device further comprises the following steps:

in response to the face area of the user being in the active state, increasing the capturing frame rate corresponding to the image capturing device to increase a input quantity of the real-time images inputted to the neural network; and in response to the face area of the user being in the inactive state, decreasing the capturing frame rate corresponding to the image capturing device to decrease the input quantity of the real-time images inputted to the neural network.

9. The face tracking method of claim 1, wherein the behavior state includes an active state and an inactive state, and the face tracking method further comprises the following steps:

receiving an environmental sound signal corresponding to a physical space where the user is located, wherein the environmental sound signal is generated by a microphone; and analyzing whether the environmental sound signal is a human voice or a non-human voice to determine whether the face area corresponding to the user is in the active state or the inactive state.

10. The face tracking method of claim 9, wherein the environmental sound signal is generated by the microphone disposed around the face area of the user.

11. A face tracking device, comprising:
an image capturing device, being configured to generate a plurality of real-time images including a face area corresponding to a user; and
a processor, being electrically connected to the image capturing device, and being configured to perform operations comprising:
determining a behavioral state corresponding to the face area of the user based on the real-time images;
adjusting an inference rate of a neural network based on the behavioral state; and
generating a face tracking information corresponding to the user based on the real-time images and the neural network, wherein the neural network is controlled to execute based on the inference rate.

12. The face tracking device of claim 11, wherein the face tracking information includes a face blend shape information, and the processor is further configured to perform the following operations:

inputting the real-time images into the neural network to generate the face blend shape information corresponding to the user, wherein the face blend shape information corresponds to a plurality of face muscle tension values in the face area; and generating a face expression corresponding to a virtual character of the user based on the face blend shape information.

13. The face tracking device of claim 11, wherein the behavior state includes an active state and an inactive state, and the processor is further configured to perform the following operations:

calculating a first image variation degree of the real-time images corresponding to a time interval;

in response to the first image variation degree being greater than a first variation threshold, determining that the face area corresponding to the user is in the active state; and in response to the first image variation degree being less than the first variation threshold, determining that the face area corresponding to the user is in the inactive state.

14. The face tracking device of claim 11, wherein the behavior state includes an active state and an inactive state, the processor is further configured to perform the following operations:

calculating a second image variation degree of the real-time images corresponding to a queue quantity;

in response to the second image variation degree being greater than a second variation threshold, determining that the face area corresponding to the user is in the active state; and in response to the second image variation degree being less than the second variation threshold, determining that the face area corresponding to the user is in the inactive state.

15. The face tracking device of claim 11, wherein the behavior state includes an active state and an inactive state, and the processor is further configured to perform the following operations:

in response to the face area of the user being in the active state, increasing the inference rate of the neural network; and in response to the face area of the user being in the inactive state, decreasing the inference rate of the neural network.

16. The face tracking device of claim 15, wherein the neural network corresponds to a highest preset inference rate and a lowest preset inference rate, and the processor is further configured to perform the following operations:

in response to the face area of the user being in the active state, gradually increasing the inference rate of the neural network to the highest preset inference rate based on a first adjustment value; and in response to the face area of the user being in the inactive state, gradually decreasing the inference rate of the neural network to the lowest preset inference rate based on a second adjustment value.

17. The face tracking device of claim 11, wherein the behavior state includes an active state and an inactive state, and the processor is further configured to perform the following operations:

adjusting a capturing frame rate of the image capturing device configured to generate the real-time images by determining whether the face area corresponding to the user is in the active state or the inactive state.

18. The face tracking device of claim 17, wherein the operation of adjusting the capturing frame rate corresponding to the image capturing device further comprises the following operations:

in response to the face area of the user being in the active state, increasing the capturing frame rate corresponding to the image capturing device to increase a input quantity of the real-time images inputted to the neural network; and in response to the face area of the user being in the inactive state, decreasing the capturing frame rate corresponding to the image capturing device to decrease the input quantity of the real-time images inputted to the neural network.

19. The face tracking device of claim 11, wherein the behavior state includes an active state and an inactive state, and the processor is further configured to perform the following operations:

receiving an environmental sound signal corresponding to a physical space where the user is located, wherein the environmental sound signal is generated by a microphone; and analyzing whether the environmental sound signal is a human voice or a non-human voice to determine whether the face area corresponding to the user is in the active state or the inactive state.

20. A face tracking system, comprising:

an image capturing device; and a head-mounted display, being communicatively connected to the image capturing device;

wherein the face tracking system is configured to perform the following operations:

receiving, by the head-mounted display, a plurality of real-time images including a face area corresponding to a user from the image capturing device;

determining, by the head-mounted display, a behavioral state corresponding to the face area of the user based on the real-time images;

adjusting, by the head-mounted display, an inference rate of a neural network based on the behavioral state; and generating, by the head-mounted display, a face tracking information corresponding to the user based on the real-time images and the neural network, wherein the neural network is controlled to execute based on the inference rate.

* * * * *